United States Patent
Lee et al.

(10) Patent No.: US 11,695,774 B2
(45) Date of Patent: Jul. 4, 2023

(54) SYSTEM AND METHOD FOR FEDERATED IDENTITY FUNCTIONALITY FOR API DEVELOPMENT

(71) Applicant: Polybit Inc., San Francisco, CA (US)

(72) Inventors: Jacob Jong-Koo Lee, San Francisco, CA (US); Keith Horwood, San francisco, CA (US)

(73) Assignee: Polybit Inc., San Francisco, CA (US)

( * ) Notice: Subject to any disclaimer, the term of this patent is extended or adjusted under 35 U.S.C. 154(b) by 0 days.

(21) Appl. No.: 17/357,382

(22) Filed: Jun. 24, 2021

(65) Prior Publication Data

US 2022/0021677 A1  Jan. 20, 2022

Related U.S. Application Data

(60) Provisional application No. 63/043,726, filed on Jun. 24, 2020.

(51) Int. Cl.

| | |
|---|---|
| *H04L 9/32* | (2006.01) |
| *H04L 9/40* | (2022.01) |
| *H04L 9/08* | (2006.01) |
| *H04L 67/133* | (2022.01) |
| *H04W 12/084* | (2021.01) |

(52) U.S. Cl.
CPC .......... *H04L 63/101* (2013.01); *H04L 9/0861* (2013.01); *H04L 9/3213* (2013.01); *H04L 63/0815* (2013.01); *H04L 67/133* (2022.05); *H04W 12/084* (2021.01)

(58) Field of Classification Search
CPC . H04L 63/08; H04L 63/0815; H04L 63/0807; H04L 63/10; H04L 63/101; H04L 9/32; H04L 9/3213; H04W 12/08; H04W 12/084
See application file for complete search history.

(56) References Cited

U.S. PATENT DOCUMENTS

| | | | |
|---|---|---|---|
| 7,076,633 B2 | 7/2006 | Tormasov et al. | |
| 8,819,121 B2 | 8/2014 | Ravichandran et al. | |
| 9,288,608 B2 | 3/2016 | Richardson et al. | |
| 9,825,930 B2 * | 11/2017 | Fu | ........................ H04L 63/0807 |
| 10,015,167 B1 * | 7/2018 | O'Kennedy | .............. G06F 9/54 |
| 10,055,578 B1 * | 8/2018 | Marquardt | .............. G06F 21/44 |
| 10,701,160 B2 | 6/2020 | Horwood | |

(Continued)

OTHER PUBLICATIONS

G. Lawton, "Developing Software Online With Platform-as-a-Service Technology," in Computer, vol. 41, No. 6, pp. 13-15, Jun. 2008 doi: 10.110/MC.2008.185.

(Continued)

*Primary Examiner* — Shaqueal D Wade-Wright
(74) *Attorney, Agent, or Firm* — Alpine Patents LLC; Brian Van Osdol

(57) ABSTRACT

A system and method for federated identity functionality for API integration can include creating an identity token associated with an application service; in association with the application service, configuring a linked service token of an external service; storing the linked service token in association with the identity token; invoking the application service which includes validating the identity token and performing an application programming interface (API) interaction with the external service using the linked service token.

11 Claims, 7 Drawing Sheets

---

Creating an identity token associated with an application service S110

In association with the application service, configuring a linked service token of an external service S120

Storing the linked service token in association with the identity token S124

Invoking application service which includes validating the identity token and performing an API interaction with the external service using the linked service token S130

(56) References Cited

U.S. PATENT DOCUMENTS

| | | |
|---|---|---|
| 2003/0144894 A1 | 7/2003 | Robertson et al. |
| 2006/0111880 A1 | 5/2006 | Brown et al. |
| 2009/0216711 A1 | 8/2009 | Yu et al. |
| 2010/0250949 A1* | 9/2010 | Torino .................. H04L 9/3247 713/176 |
| 2014/0136936 A1 | 5/2014 | Patel et al. |
| 2020/0296143 A1* | 9/2020 | Mohamad Abdul ......................... H04L 65/1073 |
| 2022/0021677 A1 | 1/2022 | Lee et al. |

OTHER PUBLICATIONS

Jiangang Ma, Yangchun Zhang, Jing He, "Efficiently Finding Web Services Using a Clustering Semantic Approach", CSSSIA 2008, Apr. 22, 2008, ACM ISBN 978-1-107-1/08/04.

* cited by examiner

Creating an identity token associated with an application service S110

In association with the application service, configuring a linked service token of an external service S120

Storing the linked service token in association with the identity token S124

Invoking application service which includes validating the identity token and performing an API interaction with the external service using the linked service token S130

FIGURE 1

SYSTEM AND METHOD FOR FEDERATED IDENTITY FUNCTIONALITY FOR API DEVELOPMENT

CROSS-REFERENCE TO RELATED APPLICATIONS

This Application claims the benefit of U.S. Provisional Application No. 63/043,726, filed on 24 Jun. 2020, which is incorporated in its entirety by this reference.

TECHNICAL FIELD

This invention relates generally to the field of developer tools, and more specifically to a new and useful system and method for federated identity functionality for web-based API development.

BACKGROUND

There are a wide variety of tools and resources available to developers. In recent years, web-based application programming interfaces (APIs) have grown in popularity not just as a way of accessing functionality but as a "product" offered by businesses and services. Consumers of web-based APIs can benefit by leveraging functionality built and managed by others within their own applications and services. However, the approach to providing a web-based API or any programmatic interface is highly fractured with numerous API standards in use. This can be burdensome to API consumers in that they must customize how each API is integrated into their product or service. Additionally, with many API services, great complexity arises through interaction with each individual API, wherein each API may have different protocols for security, authentication, and communication.

As part of an integration with an API service, various credentials are often shared and used in interacting with the API service. Often a shared secret from the API service is shared and stored as a variable. An account with the API service can be vulnerable if the shared secret is not used properly and exposed as part of an integration with the API service.

Thus, there is a need for the creation of a federated identity that can be efficiently implemented over a broad span of web-based APIs. This invention provides such a new and useful system and method.

BRIEF DESCRIPTION OF THE FIGURES

FIG. 1 is a flowchart representation of a first method;

DESCRIPTION OF THE EMBODIMENTS

Figure 2:
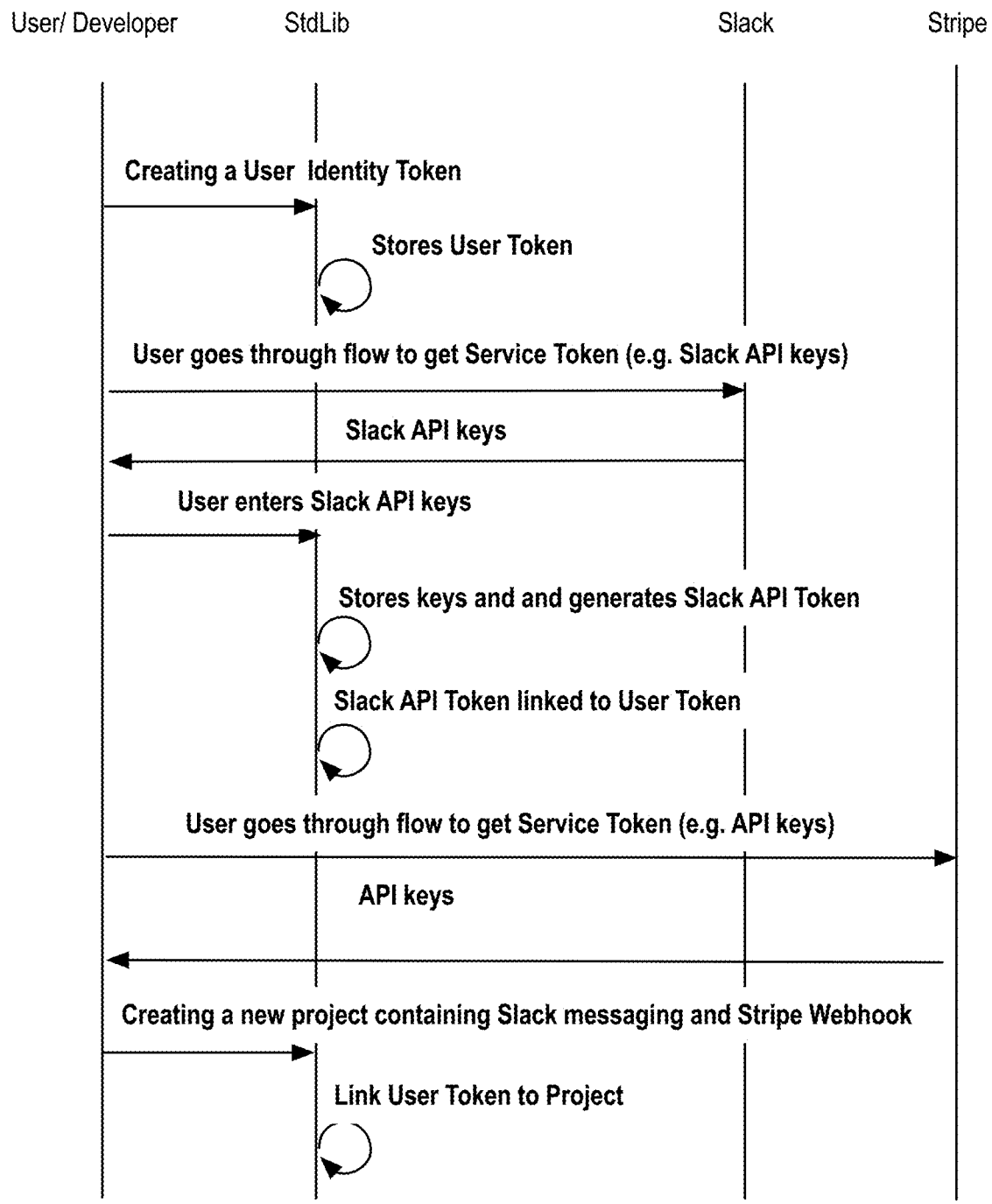
FIG. 2 is a flowchart representation of a first example method implementation.

The following description of the embodiments of the invention is not intended to limit the invention to these embodiments but rather to enable a person skilled in the art to make and use this invention.

1. Overview

A system and method for a unified authentication and credential management system over multiple web-based application programming interfaces (APIs) function to provide a streamlined approach to the implementation of automated processes over multiple external services; particularly in the usage of APIs that communicate with external services through imperative calls and event triggers (e.g. webhooks). The system and method can make use of identity tokens that are associated with linked service tokens used in API access to external services. The identity token can function within an application service as a keychain to user specific credentials, authentication tokens, and/or other keys or credentials used in interacting with a third-party API. The system and method may thus include setting up a federated identity; creating an application service (e.g., an automated process) associated with the federated identity, the application service containing configuration with imperative and/or event triggers to external resources; and executing the application service, thereby using the federated identity to access appropriate linked service tokens used when performing API interactions with the external resources.

The system and method may be implemented at any level of software development. The system and method may be implemented standalone, as part of a resource library or as a service (e.g. Software as a Service SaaS). In one exemplary implementation, the system and method may be used within a SaaS (Software as a Service) or PaaS (Platform as a Service) solution that enables creation and operation of network accessible applications, scripts, or services. These may be implemented as a general tool for those needing to create such an automated process. Alternatively, this type of platform may be integrated within a specific SaaS or PaaS offering some specific service such as payment, communication, data management, content management, and/or other suitable type of computer-related service.

Herein, the system and method will be described often using the example of implementing the system and method in connection with an application computing platform. The application computing platform may be characterized is a service that enables creation and/or configuration of an application service. The application service can function as an automated process, a script, or workflow. The application service as part of the system and method, can make use of one or more external API services.

The external service is will generally be a third-party web service exposing an API (public or private). Accordingly, the external service may alternatively be characterized as an API-accessible external service. The API of the external service is preferably a hypertext transfer protocol (HTTP) based application layer using a version of HTTP and/or HTTPS (Hypertext Transfer Protocol Secure) or any suitable application layer based protocol. A HTTP-based API (i.e., a web API) may use any suitable type of API such as a representational state transfer (REST) API, a resource-oriented architecture (ROA) API, a resource description framework (RDF) API, a simple object access protocol (SOAP), service-oriented architecture (SOA) API, a GraphQL API, and/or any suitable type of API.

The HTTP-based API of the external service may use any suitable approach to authenticating and/or authorizing access to the external service. As described herein the application services may make use of an API to interact with an external service within the scope of an account on the external service, as a sub-account of the external service, as a resource on the external service, and/or within any suitable scope. The linked service token of an external service may be used in authenticating and/or authorizing requests originating from the application service to the external service. For example, read and write requests may be made via the API to an external web API service. The linked service token of an external service may additionally or alternatively be used in authenticating and/or authorizing requests originating from the external service to the application service. For example, read and write requests sent by an external service to an accessible resource of the application service (e.g., to a callback URL) may be authenticated and/or authorized using the linked service tokens.

The system and method can be used with a variety of authentication approaches. The linked service token may, in some instances, be a secret alphanumeric token of the external service. The linked service token may, in other instances, be or include any suitable collection of credentials, keys, and/or information that may be used in securing API interactions with an external service. Examples of various authentication approaches may include HTTP basic authentication, hash based message authentication (HMAC), OAuth 1.0, OAuth (2.0), other authentication standards (e.g., other versions of OAuth) and/or other forms of authentication. These approaches, depending on security protocols of the external service, may include: including the linked service token in part or whole in a header, signing messages using the linked service token in part, including the linked service token in part or whole in a bearer token. Such API security practices may depend on protection through HTTPS and SSL/TLS (secure sockets layer/transport layer security) certificates. In OAuth-based authentication, access tokens (i.e., the linked service tokens) are issued on behalf of the external service. In this case, the access tokens may be issued to the application computing platform. This may involve an authorization service issuing the access tokens with the approval of the external service. The third party then uses the access token to access the protected resources hosted by the resource server.

The system and method may provide a number of potential benefits. The system and method are not limited to always providing such benefits, and are presented only as exemplary representations for how the system and method may be put to use. The list of benefits is not intended to be exhaustive and other benefits may additionally or alternatively exist.

As one potential benefit, the system and method can enable use of a single identity token for interactions with multiple external independent web APIs. In this way, the system and method may enable identity management over a plurality of desired APIs with a single token. This may be particularly useful for SaaS APIs.

As another potential benefit, the system and method may create custom application services that are easier to create, manage, and secure. Integration with one or more external services can be streamlined into the application service configuration. Furthermore, the technical approach to enabling such API integration, enables secure management of keys by default.

As another potential benefit, the system and method may enable more secure storage of the linked service tokens. The system and method may enable a secure identity layer for API usage by an application service. For example, after configuring a linked service token (e.g., a private key), the linked service token can be securely stored within a database system of the identity management system and used only within the application computing platform. This approach can ensure that the linked service token is never used exposed within the code configured for the application service. In some variations, the linked service tokens may not be readable by any user after configuring such that the linked service tokens would not be compromised if an attacker were to gain access to an account of the application computing platform. This security can be enabled automatically through use of the system and method.

As one potential benefit, the system and method may enable an improved development process where setup of credentials for an external API may be fully or at least partially automated. For example, detection of use of an external API in the configuration of an application service (e.g., code calling the external API and/or an event trigger for the application service) may trigger a user interface update for guided entry of appropriate service tokens. Additionally, the identity layer of the system and method may be used such that linked external services for one application service may be enabled to be transferred to other application services. For example, if a user setups up a linked service token for a payment service API for a first application service with a first identity token, then the user may link the service token for the payment service API to a second application service with a second identity token. This can simplify configuration of external API services, while maintaining unique identity tokens used for each application service. Other approaches may be used for association of the identity token such as using a global identity token.

As another potential benefit, the system and method may enable a federated identity capabilities for third-party API access, wherein managed identities (with one or more associated identity tokens) can have more streamlined access to full ecosystem of external services. Additionally, federated identity may enable selective access that can allow, deny, rate limit, and even charge for API usage on a per-request basis.

2. Method

As shown in FIG. 1, a method for federated identity functionality for API integration can include: creating an identity token associated with an application service S110; in association with the application service, configuring a linked service token of an external service S120; storing the linked service token in association with the identity token S124; and invoking application service which includes validating the identity token and performing an API interaction with the external service using the linked service token S130. The method functions to enable streamlined external resource integrations (e.g. third party API interactions), preferably for application services, by leveraging federated identities used in enabling use of linked external service tokens.

Figure 4:
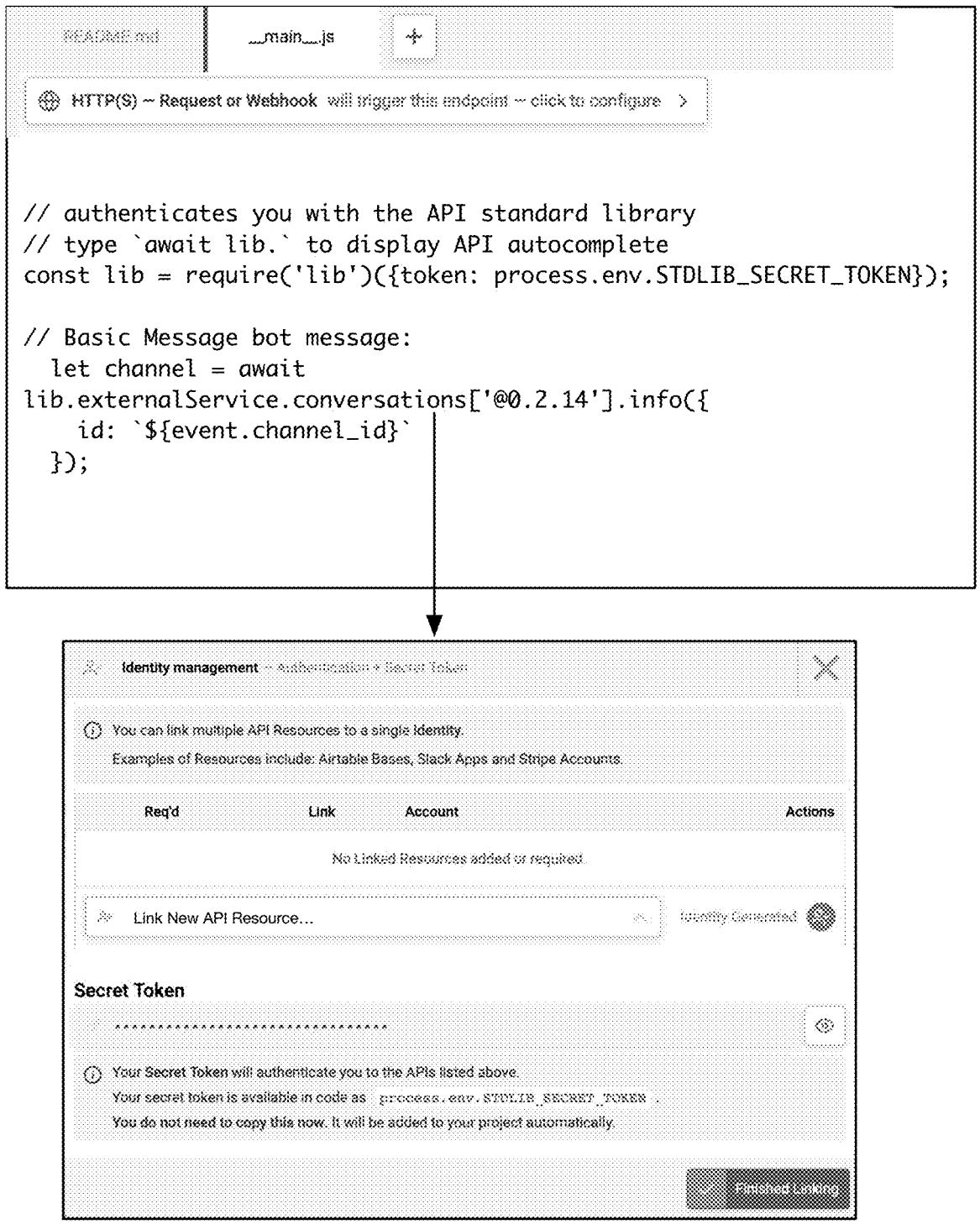
FIG. 4 is a schematic representation of one variation of configuring a linked service token.

The method can be performed as part of an application computing platform that enables users to create application services that are hosted and executed through the application computing platform. The service tokens can be configured for an application service and then securely used in response to authenticated invocation of the application service with the identity token. In such a way a developer could link one or more external services that may be used by an application service, and then use of the identity token for authenticating invocation of the application service triggers the computing platform accessing the service tokens and using the service tokens during API interactions with the external service. Accordingly, in one implementation, the method may include: creating an application service of an application computing platform for hosting application services in a managed computing environment; creating an identity token for the application service (S110); within configuration of the application service, configuring a linked service token of an external service (S120); in an identity management system of the application computing platform storing a secured association of the linked service token and the identity token (S124); deploying the application service, and when executing the application service, validating the identity token and performing an API interaction with the external service using the linked service token (S130). The managed computing environment may, for example, can be a managed server computing environment or a serverless (on-demand hosting). The linked service tokens, after collection, are stored within secure storage system and not exposed externally. In some variations, the linked service tokens be encrypted at rest using a platform secret token. In some variations, configuring the service tokens of the external service may include collecting the service tokens within a graphical user interface of the application computing platform as shown in FIG. 4.

An application service may make use of any suitable number of external services. In some instances, the method may be used in setting up multiple linked service tokens for different external services. Accordingly, the method may include: creating an identity token associated with an application service; in association with the application service, configuring a set of linked service tokens for a set of external services, wherein each linked service token is associated with a distinct external service (e.g., a different account of an API service or different resource of an API service) (S120); storing the set of linked service tokens in association with the identity token (S124); invoking application service which includes validating the identity token and performing API interaction(s) with one or more of the external services using their associated linked service tokens (S130).

The method may be used in various distinct implementations, wherein all method steps described herein may not be included in all implementations. Generally speaking, in any given implementation, the method may comprise any number of method steps, in any desired order, wherein distinct method steps may be implemented in different, or simultaneous orderings, wherein some method steps may be performed, zero, one, or multiple times as desired.

In one variation, as shown in FIG. 2, the method may comprise initially setting up a federated identity. In this variation, a single user, or multiple user identities may be created, wherein the user identity may be linked to specific, or general, API resources. These identities may then be later implemented in certain automated processes or stored (e.g. as part of a repository), potentially for future implementation. In such a variation, the configuring of a linked service token and possibly the creating of an identity token may be performed initially, and then later linked to one or more different application services.

Figure 3:
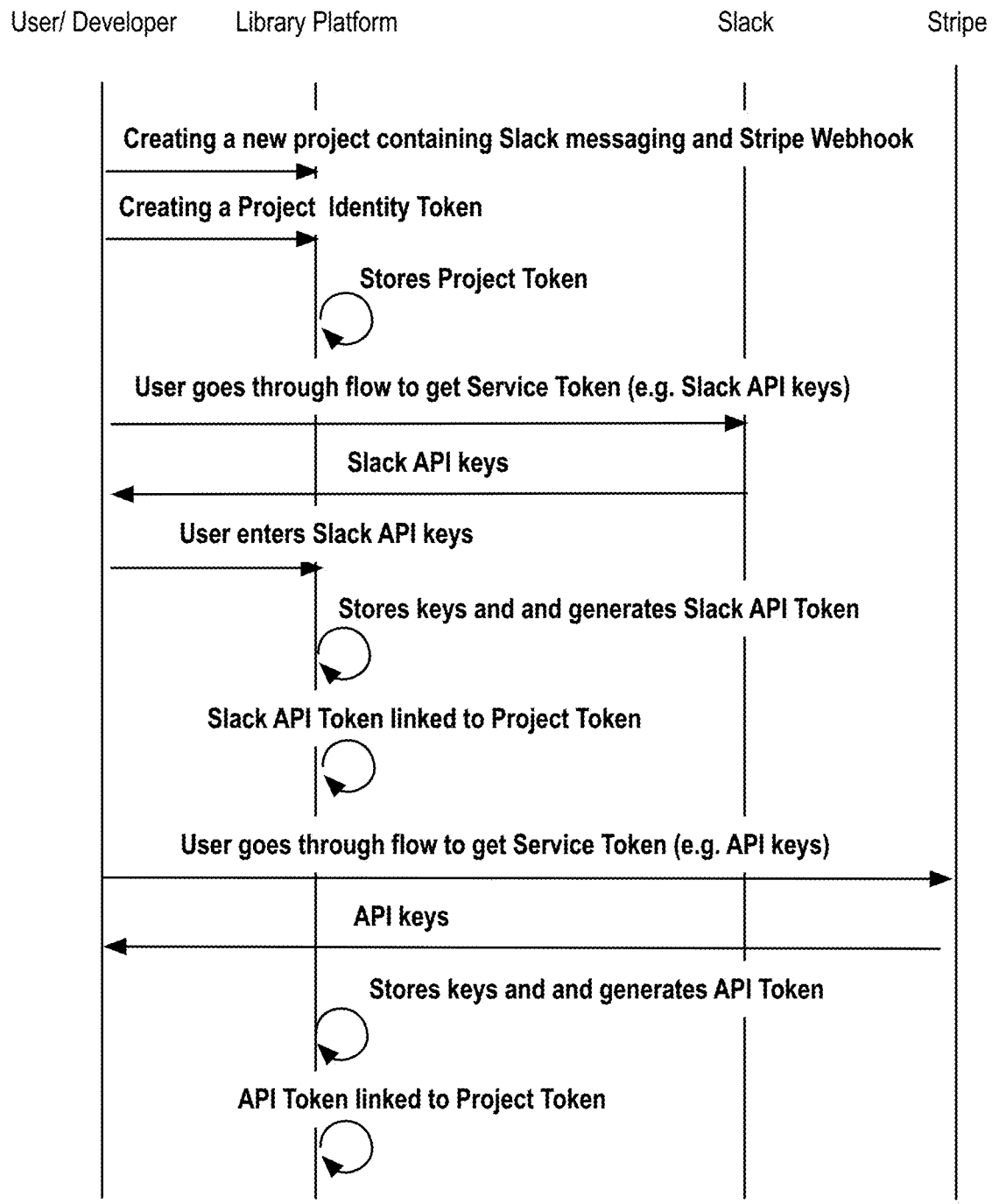
FIG. 3 is a flowchart representation of a second example method implementation.

In a second variation, setting up a federated identity, may be incorporated as part of creating an application service (e.g. a new project) as shown in FIG. 3. In this variation, the created identity and resource tokens may be designated 'process specific' (i.e., project identity token) and associated with an application service as part of or in response to creating the application service.

In some variations the method is implemented as part of a library platform for development and implementation of application services. This may be implemented to provide network accessible libraries (e.g., scripts, workflows, applications, etc.). In some variations, the library platform may enable a standardized and/or unified library package in which some or all libraries on the library platform can be accessed through a unified library package. The library platform is a platform that may provide necessary tooling to build, manage, distribute, and integrate APIs. In these variations, the method and certain method steps may be implemented as automated or semi-automated steps as part of the library package. These semi-automated/automated steps may enable incorporation of the method and/or method steps through user interface (UI) or command line tools. In some variations the library package may additionally or alternatively provide a graphical editor interface or integrated development environment through which an application service may be fully or partially defined and configured. Configuration of an application service can include configuring code logic, setting data, setting resource, and/or other customization of the application service.

The application service may be fully customizable enabling coding in one or more languages. The application service may alternatively be configured using various constraints. In one such variation, the application service can be a defined workflow that defines an interaction flow of different defined scripts or logical processes.

As presented in this application, the term 'user' may be used to refer to entity/entities that may apply the method. Dependent on implementation, 'user' may refer to a single person, multiple people, organizations, hypothetical entities, or any similar association. The term 'user' is thus generally used throughout the application, unless explicitly specified otherwise for specific applications.

Block, S110, which includes creating an identity token associated with an application service, functions to create a user/account federated identity that may be authenticated and used to access account or resource-specific external resources through the method.

The identity token is preferably used to authenticate use of linked external services and thereby use the appropriate linked service tokens for external service interactions of: an application service, a managed API call, triggered events, and the like. In this way the identity token can act as key to access a keychain of access to external services.

Figure 5:
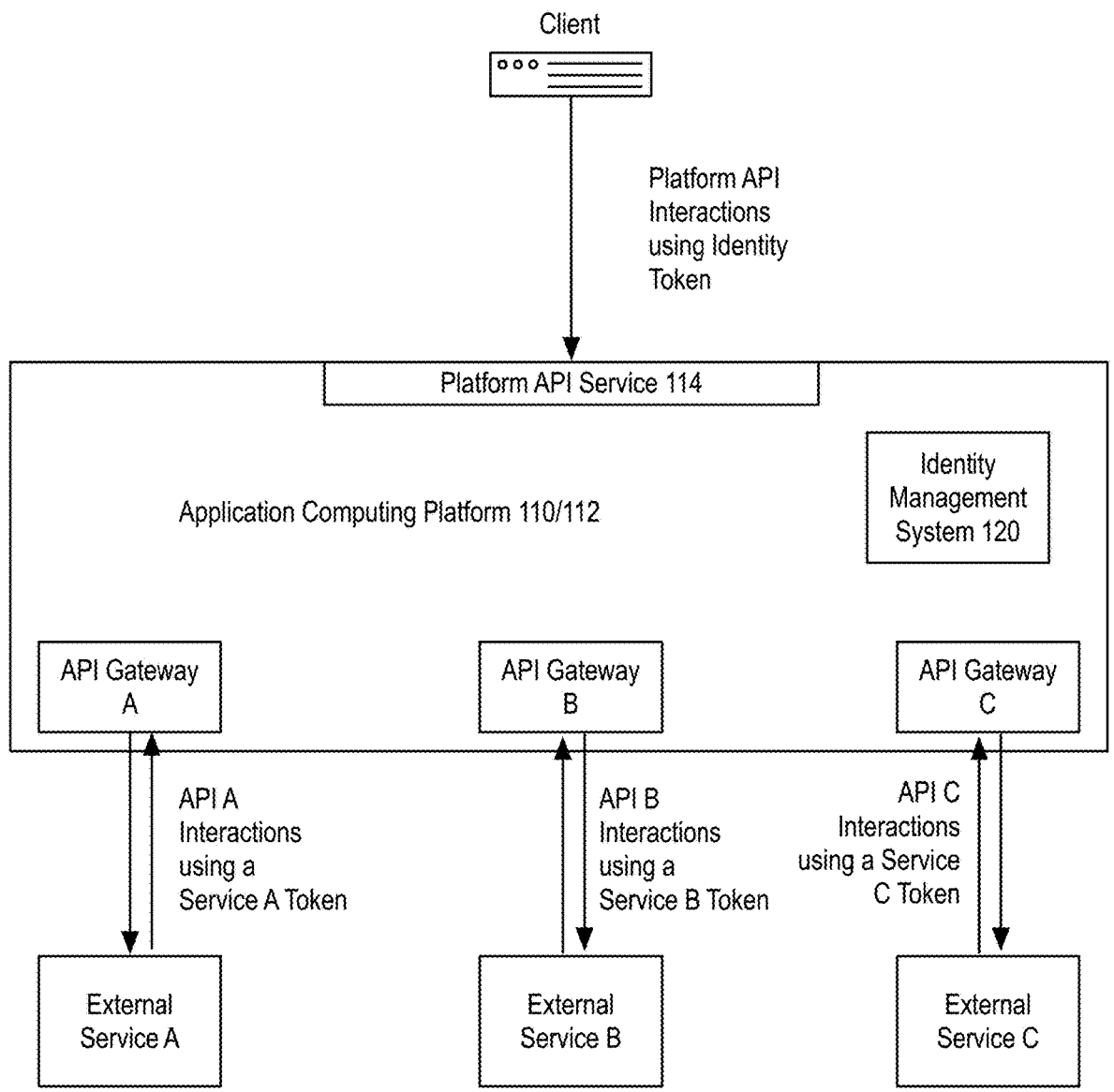
FIG. 5 is a schematic representation of exemplary forms of API integration.

The identity token is preferably a single alpha and/or numeric text token that can serve as a secret token. The secret token could be a character based string such as an alpha and/or numeric based string (e.g., with over 16 digits) or any suitable code. The identity token may be shareable with a user managing the identity such that the user can use the identity token for API access to the application computing platform. For example, the developer account used to create an application service may be able to read the identity token. The identity token when shared with an account holder may enable remote API access to the application service which can be authenticated using the identity token as shown in FIG. 5, which may function as a way of providing federate API access.

Through the method, the identity token will generally become associated with at least one service token. Accordingly the method includes creating the identity token (S110), configuring at least one linked service token (S120), and linking or associating the linked service token to the identity token, which can be performed through storing such information (S124). This linking may be implicit, based on interactions with a user interface of the application computing platform. For example, a user may create an application service, which is assigned an identity token and then any linked service tokens configured from the IDE project of the application service are implicitly linked to the identity token such as shown in FIG. 3. The linking may alternatively be determined based on receiving explicit linking requests. For example, a new identity token may be created, a new linked service token can be configured, and then a there a request may be made to link the identity token to the linked service token.

Identity tokens may be associated with specific application services (or other suitable executables) and/or accounts.

In one variation, the identity token is associated with a specific application service or a particular scope of execution like a deployable application, a script, a workflow, event trigger, and the like. The identity token may, therefore, be associated with a linked service token. Accordingly, in one variation, creating the identity token includes assigning the identity token to an application service thereby establishing an association of the identity token and the application service. In general, an application service will have a single identity token associated with its use. Alternatively multiple different identity tokens may be associated with the application service.

In one variation, creating an identity token may occur in conjunction, or in response, to creating an application service. Assigning the identity token to an application service may happen when creating an application service. Accordingly, the method may include creating an application service (e.g., an application service project) and creating an identity token in response to creating the application service. The identity token may be generated when creating a new application within a code execution service or at any suitable time such as during the first customization or inspection of an identity for the application service. For example, a developer may select an option to create a new project in an application computing platform, which creates the default configuration for an application service as well as creating an identity token for the application service. In this variation, an identity token and an application service may have a one-to-one relationship.

Assigning the identity token to an application service may assign an existing identity token to an application service, which functions to allow identity tokens to be created and potentially managed independent of an application, and then later linked to one or more application services. In one example, an identity token may be created and then an existing application service selected for association. In another example, an identity token may be created, a new application service project created, and then the linked to the new application service project.

This variation may enable an existing identity (represented by an identity token and its configuration in the system) to be linked for usage by an application service. This may enable an existing application service to change its usage to a new identity (i.e., changing identities). This may enable a copy of an existing application service to be created with the same logic but using a different identity from the original (i.e., duplicating an application for a new identity). Assigning an identity may be used in other suitable scenarios. Selective linking of an identity token to an application services may, in some variations, support one-to-many relationships for identity tokens to application services.

The application services may be managed and hosted within a computing environment (e.g., within a processor computing device) of an application computing platform. In this way, interactions, and in particular external API interactions of the application service may be fully or at least partially managed. The application service may be a script that can be run, a process that can be continuously run, a workflow, one or more triggerable actions, and/or other executable instructions that cause logic of an application service to be performed. A subset of the executable instructions relating to API interactions with one or more external service may be enabled through use of linked service tokens (as described below). The application service, in one variation, may be a webservice such as described in U.S. patent application Ser. No. 15/663,401, filed on titled "SYSTEM AND METHOD FOR A UNIFIED INTERFACE TO NETWORKED WEBSERVICES", patented as U.S. Pat. No. 10,701,160, issued on 30 Jun. 2020, which is hereby incorporated in its entirety by this reference.

In another variation, the identity tokens are associated with one or more digital account or user identity. Accordingly, the identity token may be an account or user identity token and associated with a particular user or account. In such a variation, the identity token may be created and associated with one or more user account, sub-account, group (e.g., a set of accounts and/or sub-accounts), hypothetical user (e.g. guest account), or any other type of user or user group. In some variations, a user may use such an identity token with one or more different application services. Alternatively, the identity token can serve as a general use identity token for the account. In some variations, a general use token may be used with application services and/or other forms of interactions with the implementing computing platform.

In an example of a federated API computing platform implementation, a general use identity token may be used to enable API interactions with one or more other external web APIs. After configuring linked service tokens of desired external services, ad-hoc usage of an API service can use the identity token for any suitable API interaction with a linked external API service. For example, a developer can setup and configure one or more linked service tokens to various external API services (e.g., a payment service, a messaging service, a content management service, etc.), and then use a unified API library functionality of the computing platform to issue API requests using just the identity token.

In some instance, the method may incorporate a combined use of account-based identity tokens and project/application based identity tokens.

In another variation, identity tokens may be managed through an administrative and/or access policy system. In this way, groups of identity tokens may be used to provide managed access to and usage of a shared linked service token or set of shared linked service tokens. Identity tokens may be managed by an administrator to set restrictions, setup linked service tokens, enable or revoke access to linked service tokens, setup identity tokens for new user accounts, reset identity tokens, and/or perform other administrative actions relating to identity tokens and associated linked service tokens. In this way the method may include, setting access policy to an identity token which may involve permitting or restricting usage; adding shared access to a linked service token (e.g., a company's private API key shared with select developers could be an example of such a shared linked service token); setting API capability restrictions (e.g., setting permitted API interactions); limiting amounts of API usage (e.g., API usage rate limiting, limiting number of API calls, and the like; setting time windows for access); and/or other ways of defining specialized access policy. Setting API capability restrictions may, for example, include: setting which API calls are permitted (e.g., setting permitted or restricted API resource); generally permitting read, write, editing capabilities; specifying particular resource access (e.g., API calls are permitted and/or restricted for particular resources identifiers); and/or other limits on capabilities, which may depend on the type of external service. This ability to delegate access and set restrictions can be performed independent of the external service, and, in some preferred implementations, the shared API usage associated with the linked service token will appear to the external service as just general usage of the account.

As one example of setting access policy, a company may enable link service tokens for one or more external web API services. Different identity tokens may be generated and assigned to different developer accounts, so that the developer accounts can build application services that can use the external web API services used by the company. This method variation can enable account level API access without the developer being exposed to the underlying linked service tokens. This can mean that access can be revoked for a particular developer without impacting the API usage of other developers. Additionally, the usage of the external API services can be managed and restricted based on any suitable configured policy. While this scenario uses the example of a company and its developers, this identity token management may be used in a variety of ways. For example, an identity token can be shared with other applications or services to permit that application or service API access without exposing underlying service tokens.

Block S120, which includes configuring a linked service token of an external service, functions to establish or setup for integration with a third-party web API or other type of external service. In some variations, configuring the linked service token is in association with the application service. However, as described above, the method may be configured for an account, a sub-account, a group of accounts or any suitable scope of usage.

The linked service token can be one or multiple pieces of configuration data/information that are used in performing authenticated access of an external service. In general, the linked service token are configuration elements used in authenticating API access to the external service. The linked service token for a subset of external services may be a secret key or token. Alternatively, the linked service token may specify other forms of credentials such as a username and password used in performing automated login to an external service. The form of the linked service token may depend on the authentication requirements and access protocol of a particular external service. In general, the service token will be generated and shared by the external service. Depending on how configuration is performed, the service token may, in some variations, be entered through a user interface by a user, and/or communicated by the external service (e.g., after user performs some other authentication steps to authorize granting of access).

The service token preferably authenticates interactions with a particular resource of the external service. The resource will generally be an account so that the service token, in many instances, authenticates access to an account of the external service (i.e., a linked account service token). In one exemplary instance, the linked service token of the external service can be a secret token to an account of the external service. In other instances, the resource may be a media or data resource such that the service token may authenticate access to a particular data resource of the external service. In one exemplary instance, the linked service token of the external service is a secret token to a resource of the account of the external service. For example, a service token may be for authenticating API interactions with a particular cloud hosted spreadsheet or data system.

The external service may be any suitable type of service for which authentication is performed. These may generally include third party external services, and these generally be accessed as web API external services. Examples of potential external resources include: Slack, Stripe, Airtable, and Google Sheets.

The computing platform will generally perform, using the linked service tokens the API interactions with the external service. In one implementation, the external services are accessed through API gateway connector services of the computing platform. In this way the API gateway connector (and the computing platform more generally) can be operated as proxied access to the external applications. For example, an application service may include configured instructions defining various external service interactions, and those configured instructions are relayed or translated for the API gateway service, which uses the identity token in authenticating actual interactions with the external service.

The configuring of one or more linked service tokens can be associated with an application service. In one variation, the linked service token is associated with the application service because the application service includes instructions or configuration indicating the application service may depend on the external service for some operations. In another variation, the linked service token may be associated with the application service because the external service is configured as a source of a trigger event that prompts some activity by the application service. For example, a messaging web API may be trigger event source so that the application service can run a script each time a message is sent by an account.

Configuring the linked service token can include receiving the linked service token S122 and storing the linked service token in association with the identity token S124, which functions to link a linked service token to an identity token. Process block S120 may be performed any suitable number of times to configure one or more external services.

Block S122, which includes receiving the linked service token, functions to collect credentials or information that can be used to access an external service.

Receiving the linked service token will generally involve some event occurring prompting initializing linking interaction with an external service. Once prompted a user interface can facilitate collection of the linked service token through a user interface or communicated directly from the external service.

In one variation, configuring a linked service token (as part of receiving the linked service token) can include guiding configuration of integration with the external resource and receiving the resource token. Different external resources may have different processes by which they allow integration. For example, different types and forms of resource token credentials may need to be collected to integrate with an external resource. For example, APIs of external resources may use OAuth, authentication keys, and/or other authentication approaches. Guiding configuration of integration may include providing instructions to guide an individual setting up API integration. In another variation, the guided configuration may automatically update a user interface view to progress through and complete steps for obtaining requested service tokens. After service tokens are generated or accessed, they may be automatically imported. Alternatively, the resource tokens may be manually supplied through a user interface input field.

In some variations, the method may enable an external service to facilitate integration with the computing platform to enable linking the external service. In such a variation, configuring a linked service token may use an external service integration. In one implementation, the external service integration may include following a programmatic protocol for authenticating and transferring a service token to the computing platform. In another implementation, an external service may register their service with the computing platform to add the external service as a linkable external service. The external service integration may additionally include using API documentation of the external service to automate the onboarding of the external service such that the computing platform can enable use of the external service.

In one variation, initializing linking interaction with the external service may be in response to a received request (e.g., through a user interface). For example, a user may select an option to connect an external service to enable interactions with the external service. This request may then prompt a guided user interface for guiding collection of the linked service token as described above.

In another variation, initializing linking interaction with the external service may be in response to detecting linked service usage in the configuration of an application service. Accordingly, the method may include detecting usage of an external service within configuration of the application service and triggering a linking interaction flow for the external service. The linked service token can be configured through the interaction flow. This will generally be if the external service is not yet linked. In some instances, it may present the option to use a previous linked service token (e.g., from another application service) or to supply a new service token.

In one particular variation, detecting usage of the external service includes detecting an instruction in logic of the application service making use of the external service, which may involve scanning code of an application service, monitoring editing of code, or other approaches to track instruction configuration of an application service. In one implementation, the method can include providing a digital integrated development environment (IDE) for a computing platform; detecting (e.g., in real-time) a set of instructions using a linked service API and triggering a linking interaction flow for a corresponding external service. This may detect library usage of an external service, detecting HTTP communication instructions with API URIs of an external service, or using other techniques. In one implementation, a library may be provided through which instructions for one or more external services may be specified. In this variation, triggering linking can be based on detecting library usage associated with a particular external service.

In another particular variation, detecting usage of the external service includes detecting a trigger event of the application service based on the external service. This can include detecting configuration of an application service with a trigger event related to an external service; and then triggering a linking interaction flow for a corresponding external service.

Block S124, which includes storing the linked service token in association with the identity token, functions to link the information in the service token to an identity token.

The linked service tokens are preferably stored in a data system of the computing platform. The linked service token may be indexed and made queryable using the identity token. For example, for a given identity token a set of associated linked service tokens can be accessed and used internally for some API interactions.

Other indexing and querying processes may alternatively be used. In one variation, linked service tokens may be indexed by a combination of identity token and an identifier of the application service if, for example, identity tokens are not unique to the computing platform but are unique to an application. For example, this may be performed by authenticating activity by a first application service through verification of the identity token, which then allows an identifier of the application service to be used to access and use the linked service tokens.

In one variation, the linked service tokens may be encrypted at rest. A private key of the computing platform or another appropriate entity may then be used in decrypting the linked service tokens.

The identity token may function as a 'keychain' containing specific credentials/tokens or 'keys' (e.g., API authentication tokens or keys) for identification and utilization of the resource. Block S124 may enable associating a single, or multiple links to the identity token. In some variations, block S124 may additionally enable removing (un-linking) associations. Linking resource tokens to the identity token S124 may occur anytime in the life cycle of the identity token. As part of a library platform implementation, block S124 may be incorporated through a management system (e.g. Identity token Management Page), wherein associated links may be added, removed, from the identity token. Additionally, the management system may enable turning on/off certain associations for a specific automated process.

Block S130, which includes invoking the application service, functions to execute the application service. Invoking the application service can include validating use of the identity token and performing an API interaction with the external service using the linked service token. The application service is preferably executed by the computing platform such that an API gateway service (or other suitable computing platform system) can execute API calls to the external service using stored linked service tokens.

Invoking the application service S130 will generally include validating the identity token and performing an API interaction with the external service using the linked service token. Performing the API interaction can include, for an instruction in the application service specifying external service interactions, accessing the linked service token using the identity token (or based on the identity token) and performing an application programming interface using the service credentials.

Invoking the application service may be in response to a rule such as a scheduled invocation.

Invoking the application service may be part of deploying a continuously running application service. The application service can be deployed and then can respond to different requests which may or may not be authenticated.

Invoking the application service may be part of a response to receiving an API request for invocation of the application service. In this scenario, the API request may be authenticated using the identity token to verify a trusted client is making the request.

Invoking the application service may be in response to a received trigger event. This trigger event may be from an external service, where the linked service tokens may be used to verify and authenticate the received trigger event.

In one variation, invoking the application service can include injecting the identity token into the runtime of the application service. The injected identity token may be used in authenticating instructions/requests to use an external service. It may be made available as an environment variable in the code execution environment of an invoked application service.

When the application service includes instructions for API interactions, executing the application service can include translating instructions for API interactions, optionally relaying API interactions within the computing platform (before or after translation), and then executing the translated instruction using the linked service token for authenticating the interaction with the external service. As one potential benefit of the method, API interaction instructions within code of the application service will generally be specified without linked service tokens and more broadly user accounts of the computing platform may not even be able to access the linked service tokens once linked, reducing possibilities for them be exposed.

As a detailed description of on variation, invocation and execution of the application service may include receiving a request invoking execution of the application service; using the identity token in retrieving linked service token(s); sending the linked service token to external service gateway; at the external service gateway, using the linked service token for API interactions with the external service. For the request that invokes execution, the received request may be a request authenticated with the identity key. this may be performed in a variety of ways depending on authentication approach. In one variation, the request may include a signature which can be verified by verifying the signature matches a corresponding signature generated from the request and the identity token stored in the computing platform. Proper signing of the request may then trigger the computing platform to inject the identity token into execution of the application service and/or otherwise enabling use of the identity token. In another instance, the request invoking execution may come from some other event such scheduled execution by the application computing platform.

In this variation, the identity token may be used as a key to querying, however, the identity token, in some variations, may not be used directly and instead the authentication of the identity token may indirectly be used in permitting access and use of the linked service tokens. in this way, using the identity tokens in retrieving the linked service tokens may include retrieving the linked service tokens based on successful authentication of the identity token. Other suitable implementations may alternatively be used to access the stored linked service tokens using a supplied identity token.

In variations where there is no set application service, block S130 may be replaced or implemented in an alternative approach. In such a variation, instructions signaled for execution by the computing platform may be similarly processed and translated for execution. This variation may be used where ad-hoc API interactions are communicated as an incoming API request from a client device authenticated with the identity token, and the API interactions are converted and executed as outgoing API requests using a linked service token to authenticate interactions with the external service. In such a variation, the method may include receiving an API interaction request, authenticating the API interaction request with the identity token, and, if successful, performing (using an API gateway service of the computing platform) an API interaction with the external service using the linked service token.

In some variations, the method may include many security features such as the ability to re-generate the identity token, invalidate an identity token completely, or remove and de-authorize associated linked service tokens at will. Preferably, the identity tokens are securely stored by the account holders to whom they may be shared. In the library package variations, the identity token can be used as a stand-in for the resource tokens used for external resource APIs. In this way, the sensitive resource tokens are automatically protected and secured within the computing platform. If the linked token is accidentally leaked or is known by an entity who should no longer have access, then regenerating the identity token can mitigate the risk caused by exposure of the old identity token. Because of the secured inaccessible nature of the linked service tokens, this may mean that the linked service tokens can remain active.

Accordingly, the method may include resetting the identity token which comprises disassociating a previous value of the identity token (e.g., an initial identity token) and setting a new value of the identity token (e.g., a second identity token). This resetting the identity token can be performed in response to a request or detecting exposure of the identity token.

3. System

Figure 6:
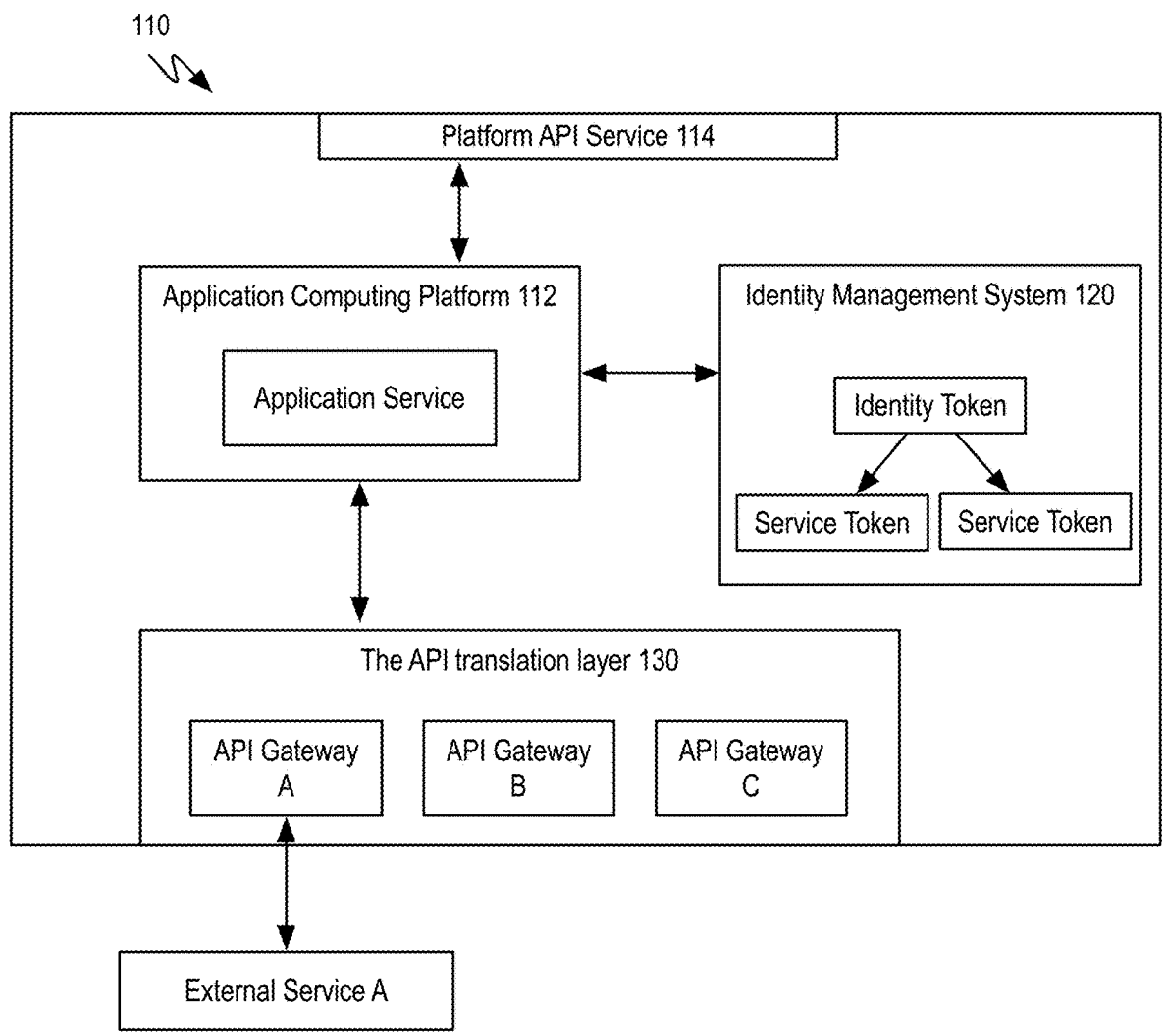
FIG. 6 is a schematic representation of a first system.

As shown in FIG. 6, a system for federated identity functionality for API integration can include a computing platform 110, an identity management system 120, and an API translation layer 130. The system is preferably a particular computer system that includes at least one non-transitory computer medium configured with instructions that when executed by one or more processors cause execution of the method or a variation of the method described herein. The system involves an integration of subsystems of a computing platform that are configured for coordinated operation, leveraging a unique process involving assigned and collected identity tokens, linked service tokens, application service configuration (e.g., code instructions and/or event triggers).

An identity token as described herein is preferably an identifier used for access to the computing platform 110. The identity token is preferably generated by the computing platform 110. It is preferably securely stored by the computing platform but can also be shared with an appropriate user. In some instances/variations, an identity token may be associated with an application service. In some instances/variations, an identity token may be associated with an account, sub-account, group of accounts or any suitable association. An identity token is preferably a single alpha and/or numeric text token that can serve as a secret token. The secret token could be a character-based string such as an alpha and/or numeric based string (e.g., with over 16 digits) or any suitable code. The identity token may be shareable with a user managing the identity such that the user can use the identity token for API access to the application computing platform. For example, the developer account used to create an application service may be able to read the identity token.

The linked service token functions as the information used in authenticating API access to an external service. the linked service token is preferably a copy of a service token that originates from an external service. The linked service token may, in some instances, be a secret alphanumeric token. the linked service token may, in other instances, be or include any suitable collection of credentials, keys, and/or information that may be used in securing API interactions with an external service. Examples of various authentication approaches may include HTTP basic authentication, hash based message authentication (HMAC), OAuth 1.0, OAuth (2.0), other authentication standards (e.g., other versions of OAuth) and/or other forms of authentication.

The application service may be a script, a process that can be continuously run, a workflow, one or more triggerable actions, and/or other executable instructions that cause logic of an application service to be performed. The application service as described herein may describe any suitable configurable execution of instructions that may involve interactions with a remote external service.

The computing platform 110 functions as the computing environment for execution of the method described herein. The computing platform 110 will generally be a cloud hosted computing platform but may alternatively be any suitable type of computing environment. It will generally be network accessible to support at least API interactions with the external services.

The computing platform in one variation may be or include an application computing system 112 that enables hosting and execution of application services. The application computing system 112 can describe a computing environment used in hosting application services. The application computing system 112 may include tooling and/or user interfaces to build, manage, distribute, and integrate APIs for application services. The application computing system 112 may additionally include accessible web user interfaces that may function to enable user token management, the creation of workflows, specific external service integrations, linking service tokens and/or applications services with general identity tokens, and invoking application services. The UI may provide other functionalities as desired.

The application computing system 112 may include an application service IDE or other type of development platform. The application service IDE may be a user interface used for configuring parts or all of an application service. In some variations, the application service IDE includes configuration to trigger user interface alerts and interactions based on the state of detected external service integrations. For example, a user interface may be displayed prompting configuring of a linked service token when code is detected that specifies instructions for some API interaction with the linked service.

Additionally or alternatively, the computing platform can include a platform API service 114 that functions to enable API interactions between a client device and the computing platform. The identity token may, in some implementations, be used as authentication token used in authenticating API use. This API may, for example, be used for: calling or triggering application services; programmatically creating, configuring, and/or otherwise setting up identity tokens, linked service tokens, and/or application services; and/or making API calls for translation for an external service.

In one implementation, the platform API service 114 may be used to translate API requests to the computing platform from a client device (authenticated with the identity token) to API requests converted for communication to the external service (authenticated with the linked service token). This variation may not make use of any pre-configured application service since the request itself specifies the action requested to be performed with the external service.

The identity management system 120 functions to manage the database systems used to store and provide access to identity tokens and the linked service tokens. The identity management system 120 stores and manages the association between identity tokens and linked service tokens. the identity management system 120 may additionally store and manage the association between the identity tokens, linked service tokens and application services. As described, some preferred variations prevent exposure of the linked service tokens outside of the computing platform after configuration and storage. In one variation, the linked service tokens can be encrypted at rest using a private platform key or secured in other suitable manners.

The API translation layer 130 functions to facilitate the translation of instructions received during application service execution or other forms of execution. The instructions are preferably translated into actual API interactions with the external services, but using linked service tokens to authenticate the interactions.

In one variation, the system may include an API library that includes methods or other forms of functionality that define the translation of library actions to API interactions. For example, a library call may indicate the external service, the API operation, and the attributes for the API operation. This translates to executing the API operation as defined by the API of the external service using the attributes and authenticated by the linked service token.

The translation may alternatively be performed in other ways. In another variation, the API translation layer 130 includes a code compiler or other translation process that converts instructions in the code to corresponding instructions.

In one variation, the API translation layer 130 can include one or more API gateway service. An API gateway service functions as a connector API interface that facilitates API interactions. In one implementation, an API gateway service may be a server-hosted service (e.g., micro-service) configured for one of a set of external service. There may be an external service specific API gateway service for each supported external service. The API gateway service can be configured for each supported external service. The rules and logic used for making API requests can be configured within each external service API gateway service.

4. System Architecture

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

In one variation, a system comprising of one or more computer-readable mediums (e.g., non-transitory computer-readable medium) storing instructions that, when executed by the one or more computer processors, cause a computing platform to perform operations comprising those of the system or method described herein such as: creating an identity token associated with an application service; in association with the application service, configuring a linked service token of an external service; storing the linked service token in association with the identity token; and invoking application service which includes validating the identity token and performing an API interaction with the external service using the linked service token.

Figure 7:
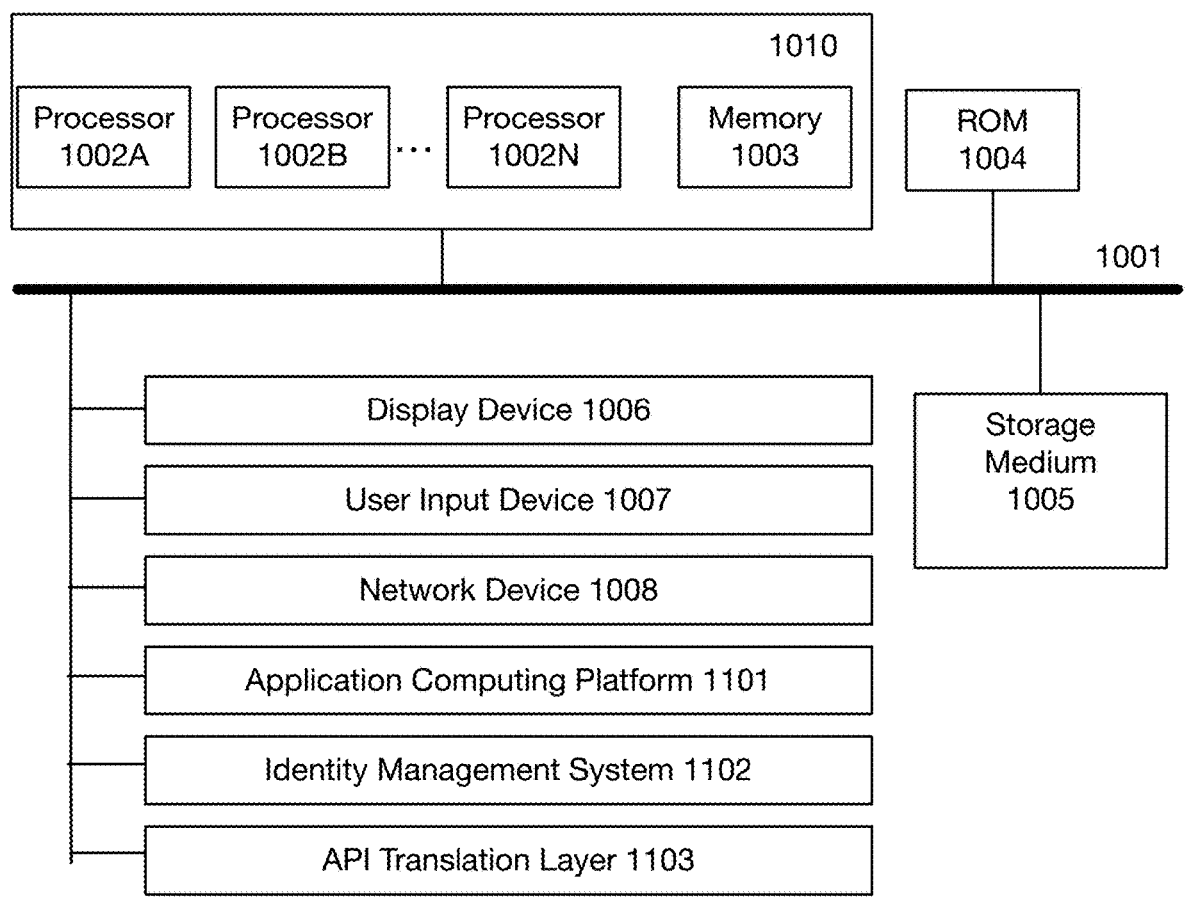
FIG. 7 is an exemplary system architecture that may be used in implementing the system and/or method.

FIG. 7 is an exemplary computer architecture diagram of one implementation of the system. In some implementations, the system is implemented in a plurality of devices in communication over a communication channel and/or network. In some implementations, the elements of the system are implemented in separate computing devices. In some implementations, two or more of the system elements are implemented in same devices. The system and portions of the system may be integrated into a computing device or system that can serve as or within the system.

The communication channel 1001 interfaces with the processors 1002A-1002N, the memory (e.g., a random access memory (RAM)) 1003, a read only memory (ROM) 1004, a processor-readable storage medium 1005, a display device 1006, a user input device 1007, and a network device 1008. As shown, the computer infrastructure may be used in connecting application computing platform 1101, identity management system 1102, API translation Layer 1103, and/or other suitable computing devices.

The processors 1002A-1002N may take many forms, such CPUs (Central Processing Units), GPUs (Graphical Processing Units), microprocessors, ML/DL (Machine Learning/Deep Learning) processing units such as a Tensor Processing Unit, FPGA (Field Programmable Gate Arrays, custom processors, and/or any suitable type of processor.

The processors 1002A-1002N and the main memory 1003 (or some sub-combination) can form a processing unit 1010. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip). In some embodiments, the processing unit includes one or more of the elements of the system.

A network device 1008 may provide one or more wired or wireless interfaces for exchanging data and commands between the system and/or other devices, such as devices of external systems. Such wired and wireless interfaces include, for example, a universal serial bus (USB) interface, Bluetooth interface, Wi-Fi interface, Ethernet interface, near field communication (NFC) interface, and the like.

Computer and/or Machine-readable executable instructions comprising of configuration for software programs (such as an operating system, application programs, and device drivers) can be stored in the memory 1003 from the processor-readable storage medium 1005, the ROM 1004 or any other data storage system.

When executed by one or more computer processors, the respective machine-executable instructions may be accessed by at least one of processors 1002A-1002N (of a processing unit 1010) via the communication channel 1001, and then executed by at least one of processors 1001A-1001N. Data, databases, data records or other stored forms data created or used by the software programs can also be stored in the memory 1003, and such data is accessed by at least one of processors 1002A-1002N during execution of the machine-executable instructions of the software programs.

The processor-readable storage medium 1005 is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like. The processor-readable storage medium 1005 can include an operating system, software programs, device drivers, and/or other suitable sub-systems or software.

As used herein, first, second, third, etc. are used to characterize and distinguish various elements, components, regions, layers and/or sections. These elements, components, regions, layers and/or sections should not be limited by these terms. Use of numerical terms may be used to distinguish one element, component, region, layer and/or section from another element, component, region, layer and/or section. Use of such numerical terms does not imply a sequence or order unless clearly indicated by the context. Such numerical references may be used interchangeable without departing from the teaching of the embodiments and variations herein.

As a person skilled in the art will recognize from the previous detailed description and from the figures and claims, modifications and changes can be made to the embodiments of the invention without departing from the scope of this invention as defined in the following claims.

We claim:

1. A method comprising:
    creating an application service in an on-demand computing platform;
    creating an identity token associated with an application service;
    providing a digital integrated development environment for configuring executable code of the application service;
    in the digital integrated development environment, detecting in the executable code of the application usage of an external service through a unified library package, and, in response, triggering a linking interaction flow for the external service thereby, in association with the application service, configuring a linked service token of the external service;
    storing the linked service token in association with the identity token;
    invoking the application service which includes:
        injecting the identity token into the runtime of the application service executing on the computing platform,
        for an instruction of the unified library package in the application service that specifies an external service interaction, validating the identity token, accessing the linked service token using the identity token, and performing an application programming interface (API) interaction with the external service using the linked service token.

2. The method of claim 1, wherein detecting usage of the external service within comprises detecting a trigger event of the application service based on the external service.

3. The method of claim 1, wherein the linked service token of the external service is a secret token to an account of the external service.

4. The method of claim 1, wherein the linked service token of the external service is a secret token to a resource of an account of the external service.

5. The method of claim 1, further comprising resetting the identity token, which comprises disassociating value of the identity token and setting a new value of the identity token.

6. The method of claim 1, further comprising setting access policy to the identity token.

7. A non-transitory computer-readable medium storing instructions that, when executed by one or more computer processors of a computing platform, cause the computing platform to perform the operations:

creating an application service in an on-demand computing platform;
creating an identity token associated with an application service;
providing a digital integrated development environment for configuring executable code of the application service;
in the digital integrated development environment, detecting in the executable code of the application usage of an external service through a unified library package, and, in response, triggering a linking interaction flow for the external service thereby, in association with the application service, configuring a linked service token of the external service;
storing the linked service token in association with the identity token;
invoking the application service which includes:
  injecting the identity token into the runtime of the application service executing on the computing platform,
  for an instruction of the unified library package in the application service that specifies an external service interaction, validating the identity token, accessing the linked service token using the identity token, and performing an application programming interface (API) interaction with the external service using the linked service token.

8. The non-transitory computer-readable medium of claim 7, wherein detecting usage of the external service within comprises detecting a trigger event of the application service based on the external service.

9. The non-transitory computer-readable medium of claim 7, further comprising resetting the identity token, which comprises disassociating value of the identity token and setting a new value of the identity token.

10. A system comprising of:
One or more computer-readable mediums storing instructions that, when executed by one or more computer processors, cause a computing platform to perform operations comprising:
creating an application service in an on-demand computing platform;
creating an identity token associated with an application service;
providing a digital integrated development environment for configuring executable code of the application service;
in the digital integrated development environment, detecting in the executable code of the application usage of an external service through a unified library package, and, in response, triggering a linking interaction flow for the external service thereby, in association with the application service, configuring a linked service token of the external service;
storing the linked service token in association with the identity token;
invoking the application service which includes:
  injecting the identity token into the runtime of the application service executing on the computing platform,
  for an instruction of the unified library package in the application service that specifies an external service interaction, validating the identity token, accessing the linked service token using the identity token, and performing an application programming interface (API) interaction with the external service using the linked service token.

11. The system of claim 10, wherein detecting usage of the external service within comprises detecting a trigger event of the application service based on the external service.

* * * * *